United States Patent
Yamamoto

[15] 3,701,204
[45] Oct. 31, 1972

[54] EDUCATIONAL PROJECTOR HAVING MOVABLE SHUTTERS

[72] Inventor: Kozo Yamamoto, Hirakata, Japan

[73] Assignee: Matsushita Electric Industrial Co., Ltd., Osaka, Japan

[22] Filed: Oct. 9, 1970

[21] Appl. No.: 79,565

[30] Foreign Application Priority Data

Oct. 11, 1969    Japan.....................44/81421

[52] U.S. Cl. .................................................35/9 E
[51] Int. Cl..............................................G09b 3/06
[58] Field of Search..........35/9 R, 9 A, 9 B, 9 E, 9 F, 35/48 R

[56] References Cited

UNITED STATES PATENTS

| R23,030 | 8/1948 | Holt...................35/9 E X |
| 2,783,454 | 2/1957 | North..................35/9 A UX |

Primary Examiner—Wm. H. Grieb
Attorney—Stevens, Davis, Miller & Mosher

[57] ABSTRACT

A projector in which a picture including a plurality of problems and answers is projected on a screen, but the answers are concealed from a viewer, the result of the choice being electrically detected at the same time as operating to reveal the answers.

4 Claims, 5 Drawing Figures

EDUCATIONAL PROJECTOR HAVING MOVABLE SHUTTERS

This invention relates to a projector and more particularly a projector to be combined with an operating device such as a teaching machine.

In a conventional projector to be combined with the multiple choice type teaching machine, previously prepared answers or instructions for every choice, are concealed by a shutter from a learner before he chooses anyone. In this kind of projector, however, the result of his choice cannot be symbolized to be recorded. As a result, it is possible for the learner to advance to the next step regardless of the instructions, even though his choice is wrong. Subsequently, there appeared an idea that the learner's operation 89 for any choice was interlocked with a switch mechanism for opening the shutter. In a more improved projector, the switch mechanism was further connected with a motor-operated typewriter for recording the learner's choice. However, these projectors could not resolve a problem in that the learner's next step should be determined according to the answer he chose. For resolving this problem it is necessary to produce a signal determined by his choice before the answer corresponding to his choice is shown to him.

An object of this invention is to provide a projector system in which a picture including a plurality of problems and answers is projected on a screen but the answers are concealed from a learner, the result of his choice being electrically detected at the same moment as operating to reveal the answer.

Figure 1:
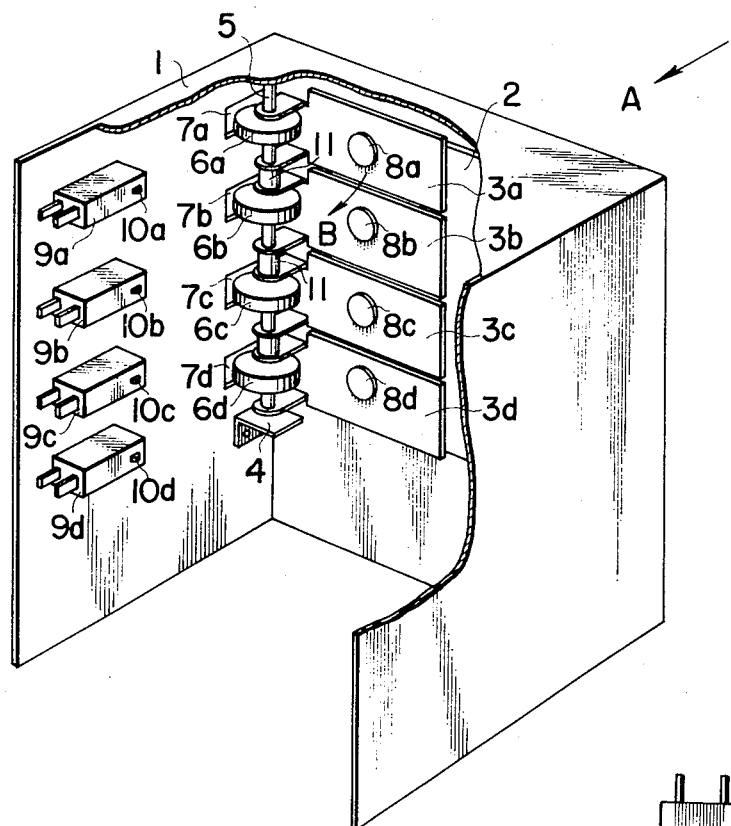
Figure 2:
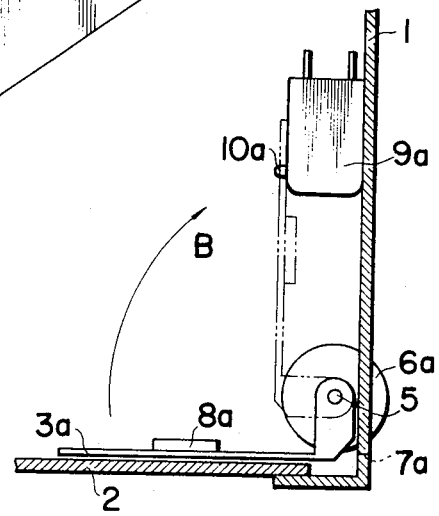
Figure 3:
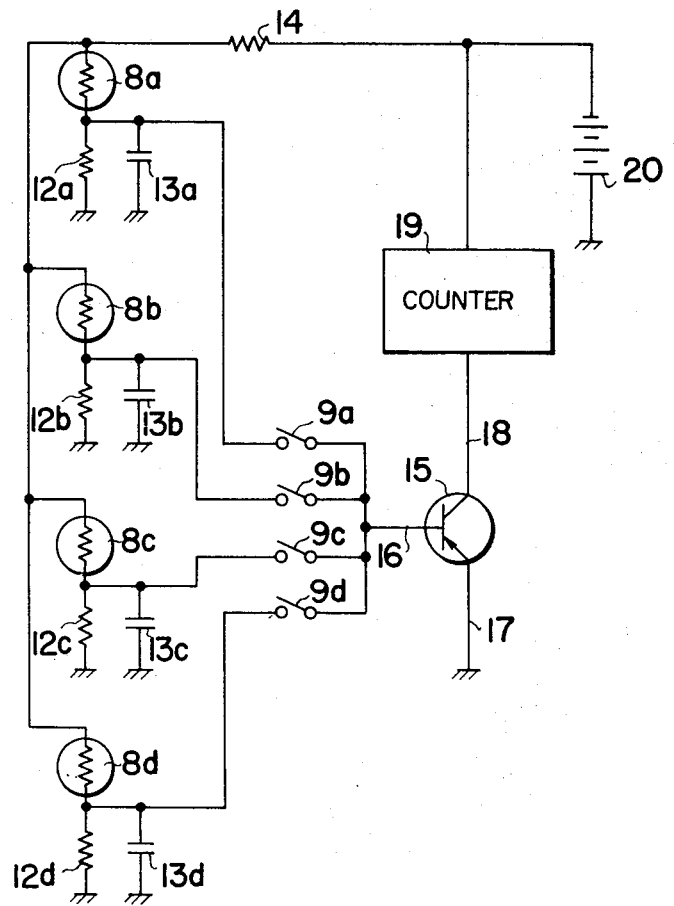
Figure 4:
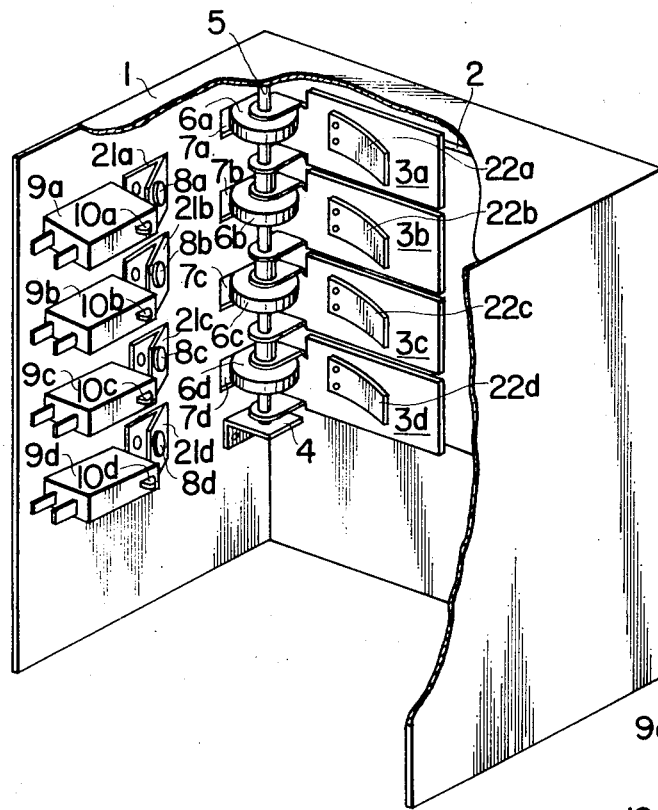
Figure 5:
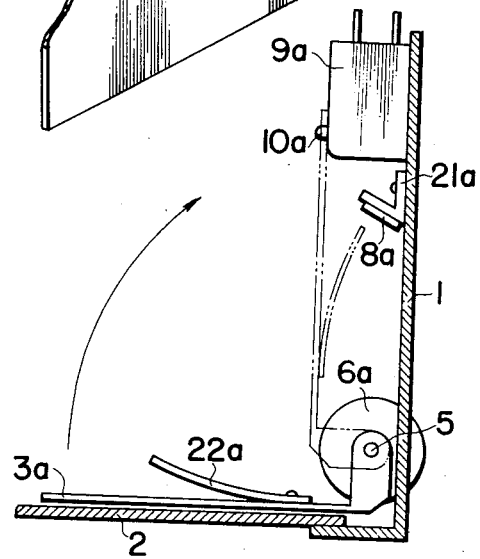

The above and other objects, features and advantages will be apparent from the detailed description in connection with the accompanying drawings in which;

FIG. 1 is a perspective view partially broken showing an embodiment according to the invention, FIG. 2 is a sectional view of an essential part of the embodiment, FIG. 3 is a circuit diagram, FIG. 4 is a perspective view partially broken showing another embodiment, and FIG. 5 is a sectional view of an essential part of the embodiment.

In FIGS. 1 and 2, reference numeral 1 is a casing providing with a screen 2 on its side. 3a to 3d are a plurality of shutters respectively fitted to a plurality of knobs 6a to 6d which are rotatably mounted on a vertical shaft 5. The knobs 6a to 6d are partially projected outside of the casing through openings 7a to 7d respectively. The shutters 3a to 3d are turned on the vertical shaft 5 by operating the knobs 6a to 6d respectively. 8a to 8d are photoconductive elements made of photoconductive material such as cadmium sulfide which are fixed on an innerside of the casing 1. 9a to 9d are a plurality of switches, each having a push-button 10a to 10d to be pushed by the schutter when it is rotated. 11 are bushings for maintaining appropriate spaces between the knobs.

In FIG. 3, 12a to 12d are resistors connected in series with the photoconductive elements 8a to 8d respectively, 13a to 13d are capacitors in parallel with the series resistors 12a to 12d, 14 is a current-limiting resistor, 15 a transistor, 16 a base thereof, 17 an emitter, 18 a collector, 19 a counter and 20 a power source.

Next the description will be made of the operation thereof. In FIG. 1, a plurality of problems according to the multiple choice method are projected on the screen 2, but answers are concealed by the shutters. The learner operates one of the knobs 6a to 6d corresponding to his choice, whereby a corresponding shutter is turned to open. Answers to be projected on the screen at the parts which are now concealed by the shutters 3a to 3d are previously arranged in such a way that an answer corresponding to the correct choice is projected with a bright picture, e.g., black letters on a white ground, and an answer corresponding to the wrong choice is projected with a dark picture, e.g., white letters on a black ground. Therefore, the correct answer can be discriminated from the wrong answer by measuring the light quantity of the pictures. The difference between the light quantity of the pictures can be detected by the resistance of the photoconductive elements 8a to 8d, by which the correct answer can be discriminated from the wrong answer.

In FIG. 1, assume that the pictures are observed in a direction shown by an arrow mark A and the answer to be projected on the screen at the part which is now concealed by the shutter 3a corresponds to the correct choice and the pictures to be projected on the screen at the parts which are now concealed by the shutters 3b to 3d correspond to the wrong choice. If the learner chooses a correct answer and operates the knob 6a, the shutter 3a is turned towards the direction shown by the arrow mark B, whereby the answer is projected on the screen so as to be observed by the learner, while the shutter is turned until the push-button 10a is pushed by it. Then the switch 9a is turned on. Again return to the original state when the shutter 3a is not yet operated. The resistance of the photoconductive element 8a is reduced to a very small value, because the bright picture is projected on the shutter 3a. As a result, most of the voltage across the series circuit of the photoconductive element 8a and the resistor 12a in FIG. 3 is applied to the resistor 12a whereby the capacitor 13a is charged by the voltage. The resistor 12a and capacitor 13a are so selected that the charge of the capacitor 13a is for a time interval from opening the shutter to closing the switch 9a before being discharged through resistor 12a. Incidentally other photoconductive elements and resistors are arranged in the same manner. When the switch 9a is closed, the voltage across the resistor 12a is supplied to the base 16 of the transistor 15, whereby the base current thereof is increased, resulting in increasing of a current carried from the emitter 17 to the collector 18. As a result, a pulse derived from the increased current causes the counter 19 to actuate. This count represents a correct choice and the counter 19 stores this count. If the learner chooses a wrong answer and operates one of the knobs 6b to 6d, one of the shutters 3b to 3d corresponding to the knob being operated is turned in the same manner, but the picture projected on any one of the shutters 3b to 3d is so dark that the photoconductive element on the operated shutter presents a resistance value much higher than the series resistance 12b to 12d. Hence most of the line voltage across the series circuit of the photoconductive element and the resistor is applied to the photoconductive element. As a result, the voltage across the resistor 12b to 12d becomes very low and, the voltage applied to the base 16 of the transistor 15 through the switch 9b to 9d is also low, whereby the current flowing through the collector is too small to actuate the counter 19.

In FIGS. 4 and 5 showing another embodiment, photoconductive elements 8a to 8d are respectively mounted on angle frames 21a to 21d which are fixed aside the switch 9a to 9d respectively. Concave reflectors 22a to 22d are respectively provided on the shutters 3a to 3d. The projected light is reflected by the concave reflectors so as to focus on the photoconductive elements 8a to 8d.

As aforementioned, if the learner chooses one of the answers and operates a knob corresponding to his choice, a picture showing answers relevant to the choice is projected on the screen, whereby the learner is able to know visually whether his choice is correct or wrong, while the photoconductive element electrically detects the result of his choice, from the brightness of the picture. A signal derived from the electric detection can be used for any purpose.

What is claimed is:

1. A teaching apparatus comprising:
    a screen on which a plurality of images may be projected, said images representing multiple choice problem and answer sets;
    a plurality of shutters movably mounted adjacent said screen;
    means for moving said shutters between first positions in which said shutters are disposed in the light path of images being projected toward said screen to block said images from being projected onto said screen and second positions in which at least one of said shutters is maintained out of said light path to permit a corresponding image to be projected onto said screen;
    a plurality of photoconductive elements which detect the quantity of light of the images projected toward said screen;
    measuring means connected to said photoconductive elements for measuring the quantity of light of the image projected onto said screen when said at least one shutter is in said second position and for generating a signal when the measured quantity of light is above a predetermined minimum level to indicate the choice of a correct answer; and
    counter means connected to said measuring means for recording the signals generated by said measuring means to indicate the total number of correct answers chosen.

2. A teaching apparatus as defined in claim 1, wherein said photoconductive elements are mounted on said shutters on the side thereof facing the direction from which said images are projected toward said screen.

3. A teaching apparatus as defined in claim 1, further comprising:
    a plurality of reflecting means mounted on said shutters on the side thereof facing the direction from which said images are projected toward said screen; and
    means mounting said photoconductive elements to detect light from reflected projected images reflected by said reflecting means.

4. A teaching apparatus as defined in claim 1, wherein:
    said measuring means comprises:
        parallel combinations of a resistor and capacitor connected in series with said photoconductive elements;
        a plurality of switch means each having one terminal connected to the junctions of the series connections of said parallel combinations and said photoconductive elements; and
        transistor switch means connected to the other terminals of said switch means, said transistor switch means being energized when one of said plurality of switch means is closed and a predetermined voltage of said transistor switch means is present at the junction of said series connections to which the closed switch means is connected; and
    said counter means is connected to the output of said transistor switch means.

* * * * *